United States Patent
Scott et al.

(10) Patent No.: US 12,351,474 B2
(45) Date of Patent: Jul. 8, 2025

(54) MAGNESIUM SILICATE PROCESSING

(71) Applicant: Aspiring Materials Limited, Christchurch (NZ)

(72) Inventors: Allan Charles Nye Scott, Christchurch (NZ); Christopher John-Paul Oze, Christchurch (NZ)

(73) Assignee: ASPIRING MATERIALS LIMITED, Christchurch (NZ)

( * ) Notice: Subject to any disclaimer, the term of this patent is extended or adjusted under 35 U.S.C. 154(b) by 0 days.

(21) Appl. No.: 18/677,479

(22) Filed: May 29, 2024

(65) Prior Publication Data

US 2024/0391789 A1 Nov. 28, 2024

Related U.S. Application Data

(63) Continuation of application No. 17/407,931, filed on Aug. 20, 2021, now Pat. No. 12,030,785.

(51) Int. Cl.
  *C01F 5/14* (2006.01)
  *B01D 53/62* (2006.01)
  *C04B 9/20* (2006.01)
  *C25B 1/20* (2006.01)

(52) U.S. Cl.
  CPC .............. *C01F 5/14* (2013.01); *B01D 53/62* (2013.01); *C04B 9/20* (2013.01); *C25B 1/20* (2013.01); *B01D 2253/1124* (2013.01)

(58) Field of Classification Search
  CPC .. C01F 5/14; B01D 53/62; C04B 9/20; C25B 1/20
  USPC ........................................................ 423/636
  See application file for complete search history.

(56) References Cited

U.S. PATENT DOCUMENTS

| | | | |
|---|---|---|---|
| 4,800,003 | A | 1/1989 | Peacey et al. |
| 4,983,342 | A | 1/1991 | Berg et al. |
| 5,091,161 | A | 2/1992 | Harris et al. |
| 5,780,005 | A | 7/1998 | Olerud |

(Continued)

FOREIGN PATENT DOCUMENTS

| | | |
|---|---|---|
| CN | 104988529 A | 10/2015 |
| EP | 2451567 A1 | 5/2012 |

(Continued)

OTHER PUBLICATIONS

Deng, XZ, et al., "Current efficiency of synthesis magnesium hydroxide nanoparticles via electrodeposition", 3rd International Conference on Material, Mechanical and Manufacturing Engineering (IC3ME 2015), 2015.

(Continued)

*Primary Examiner* — Anita Nassiri-Motlagh
(74) *Attorney, Agent, or Firm* — Holzer Patel Drennan

(57) ABSTRACT

Methods of processing magnesium silicate materials are described to produce a number of products including magnesium hydroxide. Related methods of use of processed magnesium silicate and other reaction products are described for energy production, cement manufacture and carbon sequestration. In one embodiment the method comprises subjecting a magnesium silicate source to an acid digestion; increasing the digested liquid pH to produce a magnesium salt solution; subjecting the magnesium salt solution to electrolysis; and recovering magnesium hydroxide produced from electrolysis. By-products such as silica, iron oxy(oxides) and others are also described along with further reaction products such as magnesium oxide and magnesium carbonate.

20 Claims, 7 Drawing Sheets

(56) References Cited

U.S. PATENT DOCUMENTS

| 7,329,396 | B2 | 2/2008 | Harris et al. |
| 8,470,276 | B1 | 6/2013 | Siriwardane et al. |
| 2009/0301352 | A1 | 12/2009 | Constantz et al. |
| 2013/0056916 | A1 | 3/2013 | Blencoe et al. |
| 2017/0355609 | A1 | 12/2017 | Fournier et al. |

FOREIGN PATENT DOCUMENTS

| WO | 0248036 | A1 | 6/2002 |
| WO | 2006001700 | A1 | 1/2006 |
| WO | 2010100329 | A1 | 9/2010 |
| WO | 2017222396 | A1 | 12/2017 |

OTHER PUBLICATIONS

Gartner, E., et al., "Alternative cement clinkers", Cement Concrete Research, vol. 114., pp. 27-39 (2018).

Harrison, Anna L., et al., "Influence of surface passivation and water content on mineral reactions in unsaturated porous media: Implications for brucite carbonation and CO2 sequestration.", Geochimica et Cosmochimica Acta, vol. 148, pp. 477-495 (2015).

Hartman, et al., "Thermal Dehydration of Magnesium Hydroxide and Sintering of Nascent Magnesium Oxide", IChE Journal, Mar. 1994, vol. 40, No. 3, pp. 536-542 (1994).

Hrsak, D., et al., "The decomposition of serpentine by thermal treatment", Materiali in Technologije, vol. 39, pp. 225-227 (2005).

Jarosinksi, A., et al., "New production route of magnesium hydroxide and related environmental impact", Sustainability, vol. 12, No. 21, art. 8822 (2020).

Justnes, H., et al., "Pozzolanic, Amorphous Silica Produced from the Mineral Olivine", Proceedings of the 7th CANMET/ACI. Am. Concrete Institute Special Publication, vol. 199, pp. 769-782 (2001).

Kajaste, R. , et al., "Cement industry greenhouse gas emissions—management options and abatement cost.", Journal of Cleaner Production, vol. 112, pp. 4041-4052 (2016).

Kelemen, P., et al., "An overview of the status and challenges of CO2 storage in minerals and geological formations", Frontiers in Climate, vol. 1, 482595 (2019).

Lieftink, D. J., et al., "The preparation of silica from the olivine process and its possible use as a catalyst support.", Journal of Geochemical Exploration, vol. 65., pp. 347-350 (1998).

Sanna, A., et al., "Silicate rock dissolution by ammonium bisulphate for pH swing mineral CO2 sequestration", Fuel Processing Technology, vol. 120., pp. 128-135 (2014).

Scott, A., et al., "Transformation of abundant magnesium silicate minerals for enhanced CO2 sequestration", Communications Earth & Environment, vol. 2., pp. 1-6 (2021).

Scott, A., et al., "Use of olivine for the production Of MgO—SiO2 binders", Frontiers in Built Environment, vol. 7, art. 640243 (2021).

Scrivener, K. L., "Options for the future of cement", The Indian Concrete Journal, vol. 88, pp. 11-14 (2014).

Swanson, E. , et al., "Directed precipitation of hydrated and anhydrous magnesium carbonates for carbon storage.", Physical Chemistry Chemical Physics, vol. 16., pp. 23440-23450 (2014).

Walling, S. A., et al., "Magnesia-based cements: a journey of 150 years, and cements for the future?", Chemical Reviews, vol. 116., pp. 4170-4204 (2016).

Wei, J., et al., "The reaction mechanism between MgO and microsilica at room temperature", Journal of Wuhan University of Technology—Material Science Edition, vol. 21., pp. 88-91 (2006).

MAGNESIUM SILICATE PROCESSING

CROSS-REFERENCE TO RELATED APPLICATIONS

The present application claims benefit of priority to U.S. patent application Ser. No. 17/407,931, entitled "Magnesium Silicate Processing" and filed on Aug. 20, 2021, which is specifically incorporated by reference herein.

TECHNICAL FIELD

Described herein is magnesium silicate processing. More specifically, methods of processing magnesium silicate materials are described to produce a number of by-products including magnesium hydroxide. Related methods of use of the processed magnesium silicate product(s) are described for energy production, cement and construction and carbon sequestration.

BACKGROUND

Magnesium silicates exist in nature in various rock formations in a variety of countries globally. Processing magnesium silicate in various ways is known however, existing methods of processing have drawbacks including cost of production, cost of transportation, reaction inefficiencies and so on.

Producing magnesium hydroxide may be desirable. Magnesium hydroxide and a later product, magnesium oxide, are powerful sequestration agents useful to react and bind carbon dioxide and hence reduce carbon emissions.

Magnesium hydroxide, silica and/or magnesium carbonates may also be alternative Supplementary Cementing Materials (SCM's) or alternative cements. SCM's and alternative cements are becoming more important to reduce the carbon footprint of traditional cement manufacture. Prior art SCM materials or alternative cements are however in limited supply and not always widely available when needed. Transport costs can negate the carbon footprint reduction in using such SCM materials or alternative cements and ideally sources would exist near cement manufacturing sites. SCM materials or alternative cements can also be variable in quality and hence may be a cause of variation in finished cement properties.

Problems exist in the art for manufacture of magnesium hydroxide from magnesium silicate as noted above. Alternative methods that may be more efficient in terms of cost of raw material, abundance of raw material, transport costs, processing costs and overall carbon neutrality, may be of benefit, particularly as a sequestration agent or SCM material. Further, processes with useful by-products alongside magnesium hydroxide such as magnesium oxide and silica may be useful too such as for sequestration or cement applications.

Further aspects and advantages of the magnesium silicate processing methods and uses of the processed magnesium silicate product(s) will become apparent from the ensuing description that is given by way of example only.

SUMMARY

Described herein are magnesium silicate processing methods and uses of the processed magnesium silicate products.

In a first aspect, there is provided a method of producing magnesium hydroxide by the steps of:
 selecting a magnesium silicate source;
 subjecting the selected magnesium silicate to acid digestion, to produce a digested solution;
 completing a base wash by increasing the digested solution pH to produce a magnesium salt solution;
 subjecting the magnesium salt solution to electrolysis; and
 recovering magnesium hydroxide produced from electrolysis.

In a second aspect, there is provided a method of carbon sequestration comprising the steps of:
 producing magnesium hydroxide by the steps of:
  selecting a magnesium silicate source;
  subjecting the selected magnesium silicate to acid digestion, to produce a digested solution;
  completing a base wash by increasing the digested solution pH to produce a magnesium salt solution;
  subjecting the magnesium salt solution to electrolysis;
  recovering magnesium hydroxide produced from electrolysis; and
  reacting the recovered magnesium hydroxide with carbon dioxide to sequester the carbon dioxide.

In a third aspect, there is provided a carbon sequestration agent comprising:
 magnesium hydroxide produced by a method comprising the steps of:
  selecting a magnesium silicate source;
  subjecting the selected magnesium silicate to acid digestion, to produce a digested solution;
  completing a base wash by increasing the digested solution pH to produce a magnesium salt solution;
  subjecting the magnesium salt solution to electrolysis; and
  recovering magnesium hydroxide produced from electrolysis.

In a fourth aspect, there is provided an SCM agent comprising silica produced by a method comprising the steps of:
 selecting a magnesium silicate source;
 subjecting the selected magnesium silicate to acid digestion, to produce a digested solution;
 completing a base wash by increasing the digested solution pH to produce a magnesium salt solution and precipitated silica; and
 recovering silica from the magnesium salt solution.

In a fifth aspect, there is provided a cement comprising 1-50% wt silica as a Supplementary Cementing Material (SCM) agent, the silica produced by a method comprising the steps of:
 selecting a magnesium silicate source;
 subjecting the selected magnesium silicate to acid digestion, to produce a digested solution;
 completing a base wash by increasing the digested solution pH to produce a magnesium salt solution and precipitated silica;
 recovering silica from the magnesium salt solution; and
 mixing the recovered silica with at least one cementitious compound, for example being Portland cement.

In a sixth aspect, there is provided a cement comprising 30-70% wt silica and the balance comprising magnesium oxide, wherein:
 the silica is produced by a method comprising the steps of:
  selecting a magnesium silicate source;
  subjecting the selected magnesium silicate to acid digestion, to produce a digested solution;

completing a base wash by increasing the digested solution pH to produce a magnesium salt solution and precipitated silica;

recovering silica from the magnesium salt solution; and the magnesium oxide is produced by a method comprising the steps of:

selecting a magnesium silicate source;

subjecting the selected magnesium silicate to acid digestion, to produce a digested solution;

completing a base wash by increasing the digested solution pH to produce a magnesium salt solution;

subjecting the magnesium salt solution to electrolysis;

recovering magnesium hydroxide produced from electrolysis;

dehydrating the magnesium hydroxide to produce magnesium oxide (MgO);

recovering the dehydrated magnesium oxide.

An advantage of the magnesium silicate processing methods and uses described above include providing a method of manufacture of magnesium hydroxide that is efficient in terms of cost of raw material, abundance of raw material, transport costs, processing costs and overall carbon neutrality of the method. Other advantages also result from the methods and these are described further below.

DETAILED DESCRIPTION

As noted above, described herein are magnesium silicate processing methods and uses of the processed magnesium silicate products.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

Method of Producing Magnesium Hydroxide

In a first aspect, there is provided a method of producing magnesium hydroxide by the steps of:

selecting a magnesium silicate source;

subjecting the selected magnesium silicate to acid digestion, to produce a digested solution;

completing a base wash by increasing the digested solution pH to produce a magnesium salt solution;

subjecting the magnesium salt solution to electrolysis; and recovering magnesium hydroxide produced from electrolysis.

Method of Carbon Sequestration

In a second aspect, there is provided a method of carbon sequestration comprising the steps of:

producing magnesium hydroxide by the steps of:

selecting a magnesium silicate source;

subjecting the selected magnesium silicate to acid digestion, to produce a digested solution;

completing a base wash by increasing the digested solution pH to produce a magnesium salt solution;

subjecting the magnesium salt solution to electrolysis;

recovering magnesium hydroxide produced from electrolysis; and reacting the recovered magnesium hydroxide with carbon dioxide to sequester the carbon dioxide.

A Carbon Sequestration Agent

In a third aspect, there is provided a carbon sequestration agent comprising:

magnesium hydroxide produced by a method comprising the steps of:

selecting a magnesium silicate source;

subjecting the selected magnesium silicate to acid digestion, to produce a digested solution;

completing a base wash by increasing the digested solution pH to produce a magnesium salt solution;

subjecting the magnesium salt solution to electrolysis; and recovering magnesium hydroxide produced from electrolysis.

An SCM Agent

In a fourth aspect, there is provided an SCM agent comprising silica produced by a method comprising the steps of:

selecting a magnesium silicate source;

subjecting the selected magnesium silicate to acid digestion, to produce a digested solution;

completing a base wash by increasing the digested solution pH to produce a magnesium salt solution and precipitated silica; and recovering silica from the magnesium salt solution.

An SCM Containing Cement

In a fifth aspect, there is provided a cement comprising 1-50% wt silica as a Supplementary Cementing Material (SCM) agent, the silica produced by a method comprising the steps of:

selecting a magnesium silicate source;

subjecting the selected magnesium silicate to acid digestion, to produce a digested solution;

completing a base wash by increasing the digested solution pH to produce a magnesium salt solution and precipitated silica;

recovering silica from the magnesium salt solution; and mixing the recovered silica with at least one cementitious compound, for example being Portland cement.

A Cement

In a sixth aspect, there is provided a cement comprising 30-70% wt silica and the balance comprising magnesium oxide, wherein:

the silica is produced by a method comprising the steps of:

selecting a magnesium silicate source;

subjecting the selected magnesium silicate to acid digestion, to produce a digested solution;

completing a base wash by increasing the digested solution pH to produce a magnesium salt solution and precipitated silica;

recovering silica from the magnesium salt solution; and
the magnesium oxide is produced by a method comprising
the steps of:
selecting a magnesium silicate source;
subjecting the selected magnesium silicate to acid digestion, to produce a digested solution;
completing a base wash by increasing the digested solution pH to produce a magnesium salt solution;
subjecting the magnesium salt solution to electrolysis;
recovering magnesium hydroxide produced from electrolysis;
dehydrating the magnesium hydroxide to produce magnesium oxide (MgO);
recovering the dehydrated magnesium oxide.

Material Source

The magnesium silicate source may be at least one magnesium silicate containing rock. In one embodiment, the magnesium silicate source may be selected from: olivine (including olivine group minerals), serpentine (including serpentine group minerals), pyroxenes (e.g., enstatite, clinoenstatite, augite, diopside), amphiboles, phyllosilicates, clays, and combinations thereof.

The olivine used may include ultramafic or mafic minerals.

The olivine used may be mixed with other primary rock minerals or waste mineral material.

Particles

The magnesium silicate source may be processed to a reduced particle size. Particle size reduction may occur prior to acid digestion or during acid digestion.

Particle size reduction may be to a mean particle size of less than approximately 2 mm, or less than less than 100 μm, or less than 10 μm, or less than 1 μm. The magnesium silicate source particles post particle size reduction, may have a cumulative specific surface area of at least 1 m²/kg, or at least 20 m²/kg, or at least 300-400 m²/kg.

The magnesium silicate may be amorphous. That is, the magnesium silicate particles may be of variable size and shape and not crystalline.

Acid Digestion

Acid digestion may occur at a temperature of less than 120° C.

Acid digestion may occur at a pH of −1-6 or −1-5, or −1-4, or 2-5, or 3-5, or 4-5.

The acid used to complete acid digestion may be an inorganic acid. Alternatively, the acid may be an organic acid.

In selected embodiments, the acid used may be selected from: hydrochloric acid, hypochlorous acid, sulphuric acid, nitric acid, acetic acid, citric acid, and combinations thereof.

The solid to liquid ratio, by mass, of magnesium silicate source material to liquid solution containing the acid may be approximately 1 part magnesium silicate to 2 parts liquid solution or 1:2. Alternatively, the ratio may be 1:1, or 1:1.5, or 1:2, or 1:2.5, or 1:3, or 1:3.5, or 1:4, or 1:4.5, 1:5, 1:6, 1:7, 1:8. 1:9, or 1:10, or 1:11, or 1:12, or 1:13, or 1:14, or 1:15, or 1:16, or 1:17, or 1:18, or 1:19, or 1:20. The ratio may include more than 20 parts liquid solution to 1 part magnesium silicate.

Optionally, hydrogen gas evolved during acid digestion may be recovered.

In one embodiment, acid digestion may occur for at least one hour. As may be appreciated, the exact time for acid digestion may be a function of the raw magnesium silicate source material make up, particle size, pH, acid type used, solid to liquid ratio and so on, and a time of one hour is provided by way of example only.

Water Digestion

Optionally, the above methods may comprise a further additional step of water digestion.

Water digestion may in one embodiment occur prior to acid digestion. Alternatively water digestion may occur after acid digestion.

Particle size reduction described above may occur prior to water digestion or during water digestion.

The combination of water digestion and then acid digestion processing (or acid and then water digestion processing) may occur for at least one hour. Like for acid digestion, the exact time for water digestion may be a function of the raw magnesium silicate source material make up, particle size, pH, acid type used, solid to water ratio and so on and a time of one hour is provided by way of example only.

Water digestion if completed, may occur at a temperature of less than 120° C.

Water digestion may occur using a liquid substantially made up of water. The water may have a pH from 5 to 9, or 5.5 to 8.5, or 6 to 8, or 5.5 to 7.5, or 5 to 7. The water pH may be an approximately neutral pH of approximately 7.0.

The solid to liquid ratio, by mass, of magnesium silicate source material to water in a water digestion may be approximately 1 part magnesium silicate to 1 part water or 1:1. Alternatively, the ratio may be 1:1, or 1:1.5, or 1:2, or 1:2.5, or 1:3, or 1:3.5, or 1:4, or 1:4.5, 1:5, 1:6, 1:7, 1:8. 1:9, or 1:10, or 1:11, or 1:12, or 1:13, or 1:14, or 1:15, or 1:16, or 1:17, or 1:18, or 1:19, or 1:20. The ratio may include more than 20 parts water to 1 part magnesium silicate.

Optionally, hydrogen gas evolved during water digestion may be recovered.

Base Wash

The base wash described may comprise the step or steps of increasing the pH of the digested solution to form the magnesium salt solution. A pH increase leads to a separation of certain dissolved compounds from the digested solution, typically via precipitation.

In one embodiment, the base wash may comprise at least two pH increasing steps including:
a first increase in digestion solution pH by at least 1, or 1.5, or 2, or 2.5, or 3 pH greater than the digested solution pH; and,
a subsequent pH increase in digested solution pH to a pH of 6.0 or higher.

The product of either or both (or more) steps may be termed a magnesium salt solution.

After the first increase in pH, silica may be recovered from the solution. Silica may precipitate from the digested solution and may be recovered, for example, via filtration.

After the second increase in pH, iron (as iron oxides or hydroxides) may be recovered from the solution. Iron precipitates from the solution and may be recovered for example, via filtration.

The pH of the digested solution may be increased by an alkali to the digestion solution. In selected embodiments, the alkali may be selected from: magnesium hydroxide Mg(OH)$_2$, calcium hydroxide Ca(OH)$_2$, potassium hydroxide KOH, sodium hydroxide NaOH, and combinations thereof. Note that the magnesium hydroxide described above may be made during the reaction process and not added separately—that is, the reaction end product inherently increases the solution pH. Despite this, it is possible that externally added magnesium hydroxide may be added, for example, from an alternative source or, from already manufactured magnesium hydroxide produced by the above methods. Other alkalis noted may be added separately.

The recovered silica and iron oxide minerals may have a cumulative specific surface area of at least 10 m²/kg.

The resulting magnesium salt solution may comprise aqueous magnesium salts. The magnesium salts may include magnesium chloride $MgCl_2$ and magnesium sulphate $MgSO_4$.

The above base wash processing step(s) may occur at a temperature of less than 120° C.

Silica or iron (iron oxide or hydroxide) minerals recovered may be washed to purify the silica/iron for further use.

Electrolysis

The magnesium salt solution may be subjected to electrolysis.

Electrolysis may be completed by introducing the magnesium salt solution to an electrolyser. The electrolyser used may in one embodiment comprise a porous membrane for separation of an anode and cathode. Alternatively, the electrolyser may comprise a cation selective membrane to separate the anode and cathode. In a further embodiment, a membrane free electrolyser may be used.

The magnesium salt solution may be introduced into both compartments of the electrolyser. Alternatively, the magnesium salt solution may be introduced into the anodic compartment of the electrolyser and the cathodic compartment may initially contain neutral water or a magnesium solution.

In one embodiment, the anode may be selected from: carbon, graphite, activated titanium, mixed metal oxides (MMO), and combinations thereof. Examples of MMO anodes may be titanium MMO, zirconium MMO, and niobium MMO.

In one embodiment, the cathode may be selected from: platinum, activated titanium, mixed metal oxides (MMO), nickel based alloy, and combinations thereof. Examples of MMO anodes may be titanium MMO, zirconium MMO, and niobium MMO.

In one embodiment, the cathode may be a rotating electrode with a scraper to remove magnesium hydroxide which may adhere to the surface of the electrode.

In one embodiment, the cathode may be removed periodically to allow for the recovery magnesium hydroxide which may adhere to the surface of the electrode.

Electrolysis may occur at a temperature of less than 120° C.

The electrolysis may be a continuous direct current or the current may be pulsed during electrolysis.

In one embodiment, the current may be reversed from time to time.

Hydrogen gas $H_2$ and magnesium hydroxide $Mg(OH)_2$ are produced and recovered from the electrolyser cathode while oxygen gas $O_2$ or chlorine gas $Cl_2$ is produced at the anode.

In one instance where the magnesium salt solution comprises to salt magnesium sulphate $MgSO_4$, sulphuric acid and oxygen gas may be produced and recovered from the anode.

Alternatively, where the magnesium salt solution comprises the salt magnesium chloride $MgCl_2$, chlorine gas and oxygen gas may be produced and recovered from the anode.

If the magnesium salt solution comprises both magnesium sulphate $MgSO_4$ and magnesium chloride $MgCl_2$, both of the above reaction mechanisms will occur during electrolysis.

To further illustrate the electrolysis reactions, specific reaction mechanisms may be as shown below:

Example 1—if the magnesium salt is $MgCl_2$, the following reaction would occur:

$$MgCl_2 + 2H_2O \rightarrow Mg(OH)_2 + Cl_2 + H_2 \qquad 1$$

Anode: (Including: carbon, graphite, activated titanium, titanium MMO)

$$2Cl^- \rightarrow Cl_2 + 2e^- \qquad 2$$

Cathode: (Including: platinum, activated titanium, titanium MMO, nickel based alloy)

$$2H_2O + 2e^- \rightarrow 2OH^- + H_2 \qquad 3a$$
$$Mg^{2+} + 2OH^- \rightarrow Mg(OH)_2 \qquad 3b$$

Example 2—if the magnesium salt is $MgSO_4$, the following reaction would occur:

$$MgSO_4 + 3H_2O \rightarrow Mg(OH)_2 + H_2SO_4 + H_2 + 1/2 O_2 \qquad 4$$

Anode: (Including: carbon, graphite, activated titanium, titanium MMO)

$$SO_4^{2-} + H_2O \rightarrow H_2SO_4 + 1/2 O_2 + 2e^- \qquad 5$$

Cathode: (Including: platinum, activated titanium, titanium MMO, nickel based alloy)

$$2H_2O + 2e^- \rightarrow 2OH^- + H_2 \qquad 6a$$
$$Mg^{2+} + 2OH^- \rightarrow Mg(OH)_2 \qquad 6b$$

Agitation

Agitation of the digestion solution, base wash solution and electrolysis solution may occur.

Agitation may occur by bubbling gas (e.g. air, nitrogen) through the solutions described or by mechanical agitation methods e.g. via movement of an impeller through the solutions described.

Recovery

Magnesium hydroxide may be recovered from the electrolysis solution. Recovery may be from the cathode. Recovery may be by filtration. As noted above, the cathode may be scraped to remove magnesium hydroxide coated on the anode as it evolves.

The recovered magnesium hydroxide may be washed and dried to purify the magnesium hydroxide post recovery.

Dehydration

Optionally, the method comprises an additional step after recovery of the magnesium hydroxide of:
dehydrating the magnesium hydroxide to produce magnesium oxide (MgO).

Dehydration in this embodiment may occur at a temperature of less than 1200° C., or 1100° C., or 1000° C., or 900° C., or 800° C., or 700° C., or 600° C., or 500° C., or 450° C. The temperature used may be defined by the type of magnesium oxide desired. Higher temperatures in this range may be used for example to obtain dead burnt magnesium oxide.

Magnesium Carbonate

In one embodiment, the methods above may comprise an additional step of:
reacting the recovered magnesium hydroxide with carbon dioxide to form a magnesium carbonate containing compound.

Magnesium carbonates may be useful to produce alternative cement forming compositions. This may also be another useful way to store and use carbon dioxide and hence sequester carbon dioxide emissions and/or lower the use of traditional higher carbon dioxide emitting cement compositions.

By-Products

As may be appreciated from the above, a number of by-products are made during manufacture of the magnesium hydroxide. These by-products may in themselves be useful for further processing or recovery.

Residual unreacted magnesium silicate after digestion, base washing or electrolysis may be removed and re-processed. Removal may be by a suitable solid separation method e.g. filtration, gravity separation, centrifugal separation, magnetic separation etc, or may be by removal of the magnesium silicate in solution as a slurry post digestion or electrolysis.

Silica and iron oxides as noted above may be recovered during base washing and used for example in cement manufacture or as an SCM agent.

Hydrogen gas, chlorine gas, and oxygen gas evolved during electrolysis may be collected as separate by-products. These gases produced during electrolysis can used, recycled, and/or recombined to create energy/heat for the overall process described herein or used to produce energy/heat for other processing.

Optionally, where hydrogen and chlorine gas streams are produced, these gases may be recombined to form hydrochloric acid and re-used in the acid digestion or for other processing.

Optionally, chlorine gas produced may be used directly to form hypochlorous acid for use in further acid digestion processing and the hydrogen recovered separately.

Optionally, hydrogen and oxygen gas produced may be recovered and the sulphuric acid recovered for further acid digestion or for other processing.

Magnesium hydroxide may be further processed to magnesium oxide and the magnesium oxide (with or without magnesium hydroxide) used as sequestration agents. Alternatively, magnesium oxide may be used in cement manufacture or as an SCM agent.

Advantages

Selected advantages of the magnesium silicate processing methods and uses described include:
Providing a method of manufacture of magnesium hydroxide that is efficient in terms of cost of raw material, abundance of raw material, transport costs, processing costs and overall carbon neutrality of the method.
Overall, the method described for conversion of magnesium silicate into magnesium hydroxide may produce no direct $CO_2$ emissions.
Acid used for digestion may be at least partly or even largely recoverable. The large scale and industrial use of strong acids have serious consequences if released into the environment. However, this is only an issue if there is a loss of containment from the process. The large scale handling of acid without loss of containment is well established in the chemical process industries due to its use in commodity materials such as the manufacture of PVC and pickling of steel. Neither acid nor by-products like chlorine leave the method described herein, as they may be recovered and recycled within the process.
Using the method described herein would result in a net negative $CO_2$ emission when used for carbon sequestration. The overall carbon sequestration benefits would improve substantially if low carbon energy sources, or even a mixed renewable and fossil fuel electrical supply, were used.
The methods providing an alternative SCM source thereby addressing the lack of volumes and/or quality of SCM agent currently available;
The methods provide an alternative method of magnesium silicate processing that avoids drawbacks of art methods in terms of cost, extent of reaction, by-products, and carbon neutrality.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

BRIEF DESCRIPTION OF THE DRAWINGS

Further aspects of the magnesium silicate processing methods and uses of the processed magnesium silicate products will become apparent from the following description that is given by way of example only and with reference to the accompanying drawings in which.

WORKING EXAMPLES

The above described magnesium silicate processing methods and uses of the processed magnesium silicate products are now described by reference to specific examples.

Example 1

Figure 1:
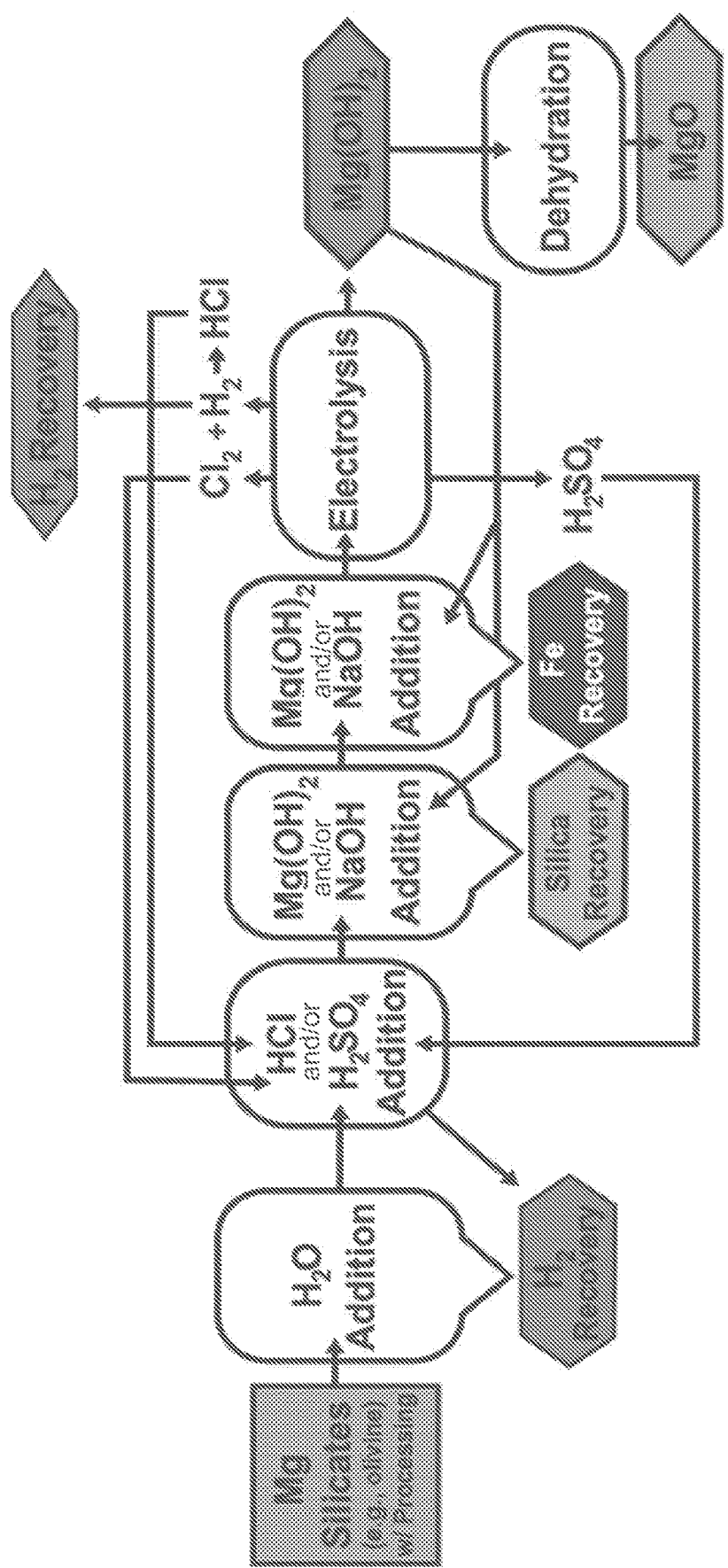
FIG. 1 shows an overall process for recovery of magnesium hydroxide $Mg(OH)_2$ with additional products being silica, iron oxy(oxide), magnesium oxide MgO, hydrogen gas $H_2$ and acids from magnesium silicate hydrolysis, digestion, electrolysis, and/or dehydration.
Figure 2:
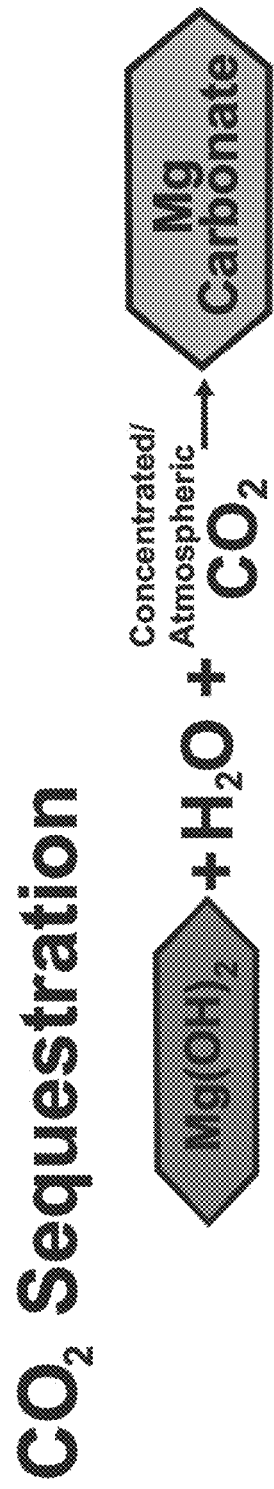
FIG. 2 shows a simplified carbon sequestration process using magnesium hydroxide. Note that the Mg carbonation product is likely to be hydrated magnesium carbonate such as nesquehonite, dypingite, or hydromagnesite, but magnesium carbonate $MgCO_3$ formation is also possible depending on reaction conditions.

The production and synthesis of $Mg(OH)_2$ described herein uses olivine, a mineral commonly present in ultramafic (e.g., peridotites and dunites) and mafic (e.g., basalt) rocks. FIG. 1 is a reaction diagram of the process. FIG. 2 shows the reaction when magnesium hydroxide is used in carbon sequestration. These reaction processes are used hereafter below.

Olivine is a nesosilicate with most mineral compositions represented in the system $MgO—FeO—SiO_2$. With acidification, olivine solubility increases, thereby, increasing Mg release rates and its concentration into solution. In the inventor's investigations, powdered forsteritic (($Mg_{0.9}Fe_{0.1})_2SiO_4$) or Mg-rich olivine (~100 g with a mean particle size of 28 µm) was combined with 500 mL of 2 M HCl. This resulted in a solution containing $MgCl_2$, $FeCl_2$, and $SiO_2$. Strong acids such as HCl and/or $H_2SO_4$ accelerate hydrolysis.

$Mg^{2+}$ concentration in the digested solution was ~24 g $L^{-1}$ as determined by complexometric titration. The Mg concentration was found to be, much higher than Mg in seawater. Therefore, the Mg extraction efficiency is improved using an HCl digestion.

Following the initial digestion, the solution was allowed to settle for ~1 hour and then it was decanted to separate Mg, Fe and Si ions from any remaining olivine (FIG. 1). Silica was precipitated using an acid swing process by increasing the pH to >3.5 by adding 1 g of $Mg(OH)_2$. Silica was produced through hydrolysis, polymerization, and condensation of silicic acid ($Si(OH)_4$). The solution pH was again increased to ~7 using 0.32 g of NaOH to precipitate iron in solution. Silica and iron were separated using a centrifuge in this example. Please note that industrial filtration system or precipitate flotation could be used in lieu of centrifuging. Direct filtration or some suitable form of solid separation is possible but may require vacuum or pressure.

The remaining $MgCl_2$ in solution underwent electrolysis in an H-cell with a carbon anode and platinum cathode where $Cl_2$ gas at the anode and $H_2$ gas at the cathode formed. $Mg(OH)_2$ formed at the cathode and pH of solution became (~9.5). $Mg(OH)_2$ from the cathode was placed in a drying oven (~100° C. for 1 day) and the dried product was assessed using scanning electron microscope (SEM), thermo gravimetric analysis (TGA) and X-ray powder diffraction (XRD). For the commercial production of $Mg(OH)_2$, $H_2$ and $Cl_2$ can be combined to produce HCl that can be reused for Mg silicate processing.

Results

From 100 g of olivine, 35 g of $MgOH)_2$, 35 g of amorphous silicate and ~5 grams of iron oxide was produced. Only 1 g of $Mg(OH)_2$ was added in the silica precipitation stage. The SEM image and TGA graph provided in FIG. 3 a,b confirm that the material recovered after electrolysis was $Mg(OH)_2$. XRD analyses provided in FIG. 3c. show the recovered silica was amorphous $SiO_2$ (note: some residual olivine was present) and that the product following electrolysis was $Mg(OH)_2$. Compositions of the olivine sand, recovered $Mg(OH)_2$, and recovered silica from olivine were determined via X-ray fluorescence (XRF) and these results are provided in Table 1.

TABLE 1

Elemental compositions of raw olivine sand and recovered $Mg(OH)_2$ and silica from olivine, determined by XRF analysis. (Cite the table)

| | $SiO_2$ | $Al_2O_3$ | $Fe_2O_3$ | CaO | MgO Wt. % | $Na_2O$ | $K_2O$ | LOI | Total |
|---|---|---|---|---|---|---|---|---|---|
| Raw olivine | 39.6 | 0.38 | 10.7 | 0.73 | 45.0 | 0.14 | 0 | 3.2 | 100.0 |
| $Mg(OH)_2$- | 0.1 | 0.11 | 6.4 | 0.30 | 60.4 | 0.03 | <0.01 | 32.3 | 99.9 |

TABLE 1-continued

Elemental compositions of raw olivine sand and recovered Mg(OH)$_2$ and silica from olivine, determined by XRF analysis. (Cite the table)

| | SiO$_2$ | Al$_2$O$_3$ | Fe$_2$O$_3$ | CaO | MgO | Na$_2$O | K$_2$O | LOI | Total |
|---|---|---|---|---|---|---|---|---|---|
| | | | | Wt. % | | | | | |
| olivine Silica-olivine | 63.2 | 0.23 | 4.7 | 0.57 | 13.9 | 0.03 | 0.06 | 16.4 | 99.0 |

Our example and approach provides a highly efficient and nearly closed system for the production of Mg(OH)$_2$ with the only additions being olivine, HCl, and minor amounts of NaOH. In addition to the recovered Mg(OH)$_2$, secondary materials (e.g., silica and iron hydroxide) provide useful products, such as a partial replacement for Portland cement and a high purity iron ore.

CO$_2$ and Energy Implications of Mg-Hydroxide Extraction

Transforming olivine into Mg(OH)$_2$ produces no direct CO$_2$ emissions. Total energy required, including mining and processed, to produce Mg(OH)$_2$ from olivine was determined to be 6.28 GJ tonne$^{-1}$. Further work may allow greater use of Mg(OH)$_2$ produced for pH control and further reduce the energy and NaOH currently required. The Mg(OH)$_2$ could be further processed into MgO but for CO$_2$ sequestration; however, Mg(OH)$_2$ is known to be a faster reactant than MgO. Although, MgO, presumably a slower reactant, does provide potential as a route to carbon sequestration.

For one tonne of CO$_2$ to be sequestered as a Mg-carbonate, including a variety of carbonate phases including nesquehonite and hydromagnesite, 1.3 tonnes of Mg(OH)$_2$ is needed and requires an energy consumption 8.17 GJ tonne$^{-1}$ of CO$_2$. Carbon sequestration benefits could be improved if low carbon energy sources were used.

Using the recovered Mg(OH)$_2$, a Mg(OH)$_2$ water slurry was pressurized with concentrated CO$_2$ (4 bar). Over a 48 hour period >50% of the Mg(OH)$_2$ was converted to a hydrated Mg-carbonate, demonstrating the CO$_2$ conversion into a solid. Reactivity of Mg(OH)$_2$ was rapid.

Figure 4:
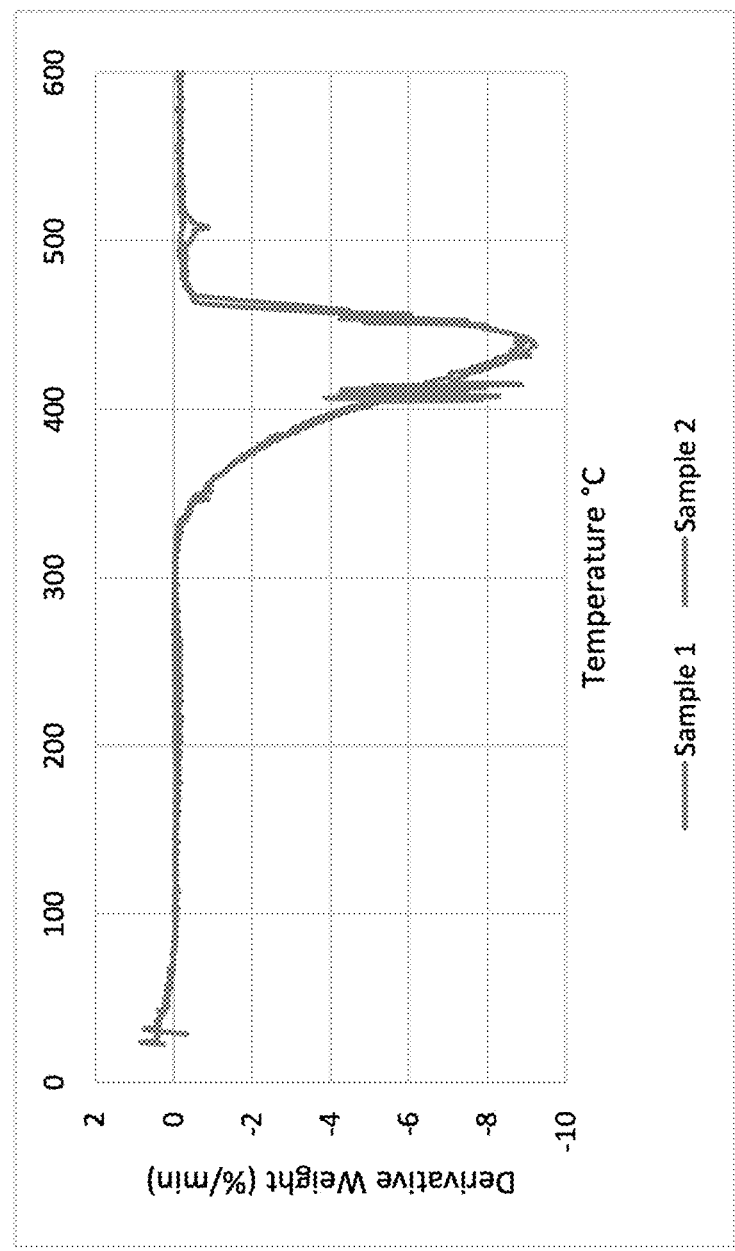
FIG. 4 shows a thermo gravimetric analysis TGA for magnesium hydroxide exposed to air (containing $CO_2$) at ambient temperatures and pressures. The small peak at approximately 500° C. indicates the presence of a magnesium carbonate compound due to the reaction between the magnesium hydroxide and the air. The other sample shown is the unreacted magnesium hydroxide which does not show a carbonate peak.

Additionally, a slurry of magnesium hydroxide and DI water was exposed to atmosphere concentrations of CO$_2$ at ambient temperatures and pressures and under a humidity of approximately 90%. After a period of one week of exposure a sample was collected and assessed using thermogravimetric analysis (TGA). FIG. 4 shows the differential (DTGA) results for the unreacted material prior to exposure together with a curve for the material after one week exposure. The peak just past 500° C., of the reacted material, indicates the formation of a magnesium carbonate containing compound and verifies the potential suitability of the material for carbon sequestration.

Olivine Resources and Implications

Figure 5:
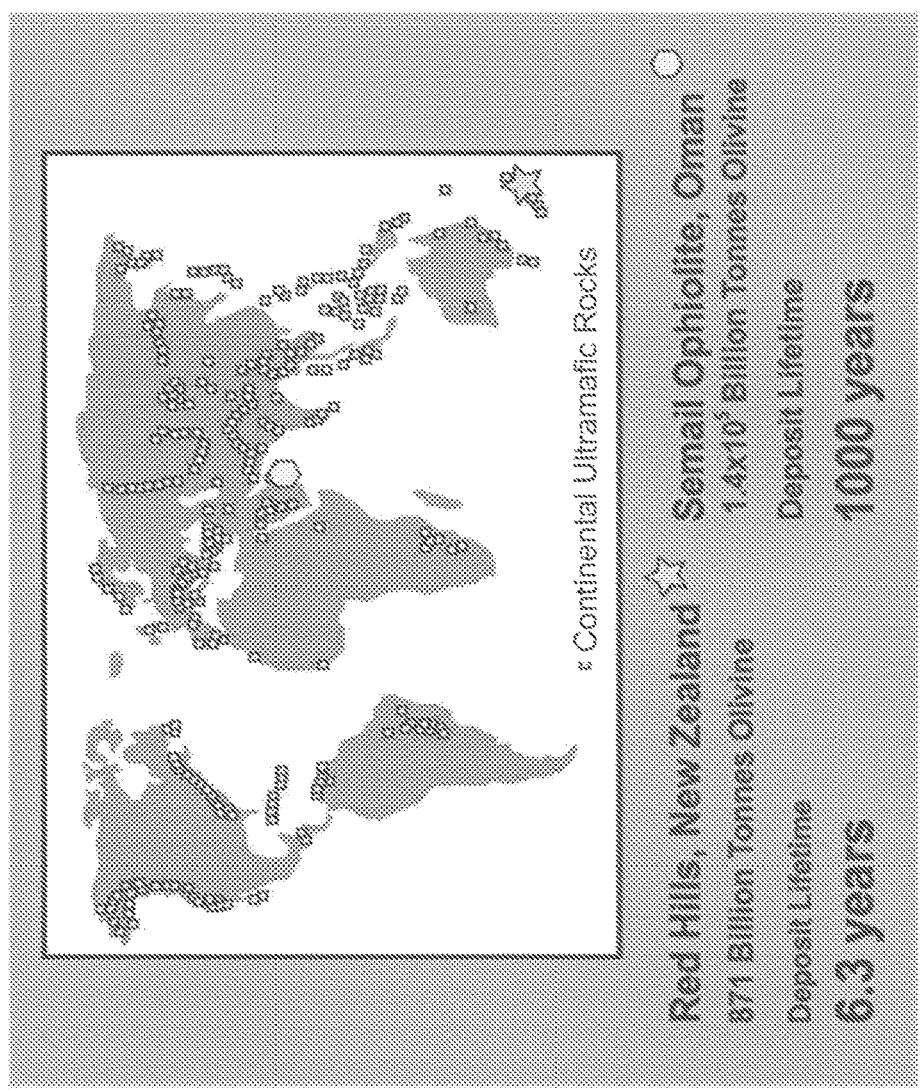
FIG. 5 Illustrates the distribution of ultramafic rocks and olivine lifetime estimates. The general distribution of ultramafic rocks (including peridotites and serpentinites) is shown worldwide. Ultramafic rock distributions are based on location data from art publications. The billions of tonnes of olivine per year needed to sequester all anthropogenic carbon dioxide $CO_2$, and reduce global atmospheric $CO_2$ as well as the lifetime supply of olivine from the Red Hills (New Zealand) and Semail Ophiolite (Oman) is shown based on calculations completed by the inventors.

Olivine-rich deposits (FIG. 5) are globally abundant and primarily present within populated areas near convergent margins such as the Circum-Pacific region. There is enough accessible olivine to sequester all anthropogenic CO$_2$ and further reduce global atmospheric CO$_2$ levels for thousands of years as shown in FIG. 5 which focuses on only two olivine-rich deposits that occur in Oman and New Zealand. Bulk transport of Mg(OH)$_2$ to be used for onsite point source emissions control is economically feasible and would still result in significant anthropogenic CO$_2$ reductions.

Example 2

Olivine, a Mg-rich nesosilicate and sourced from Red Hills, New Zealand, was processed/ground to an average particle size of 30 µm. Processed olivine was combined with 2M HCl in a ratio of 1:10 (% W/V), heated to 60° C. and continuously stirred; allowing for 2 hours of digestion. The mixture rested for one hour and the solution was decanted to remove the remaining olivine. Using ICP-MS, the solution was determined to consist of silica, magnesium, iron and chloride ions. Products were separated by using a pH swing process in several steps. Magnesium hydroxide (0.2% w/v) was added in the solution to increase the pH to >3 to condense and polymerize silicic acid (Si(OH)$_4$), thereby, producing silica gel. Polymerized silica was filtered and rinsed with water to remove excess acids and chlorides. Following this step, 2M NaOH was added to the filtered solution, thereby, raising the pH to 7 in order precipitate and remove (via filtration or centrifuging) iron hydroxide. The remaining solution underwent electrolysis where magnesium hydroxide formed at the cathode. ~35 g of Mg(OH)$_2$ was produced from 100 g of olivine, of which 1 g was added during the silica precipitation stage as discussed in Example 1. Hydrogen gas (cathode) and chlorine gas (anode) was produced and could be recombined to produce HCl for recycling into the initial digestion reactions. Mg(OH)$_2$ obtained was calcined for 1 hour at 500° C. for 1 hour, thereby, producing MgO.

Recovered silica (RS) and recovered MgO (RM) from olivine using the procedure discussed above was assessed as a binder and compared with commercially available MgO and silica fume using several methods including isothermal calorimetry, XRD, FTIR and SEM.

Materials and Experiments

Figure 3A:
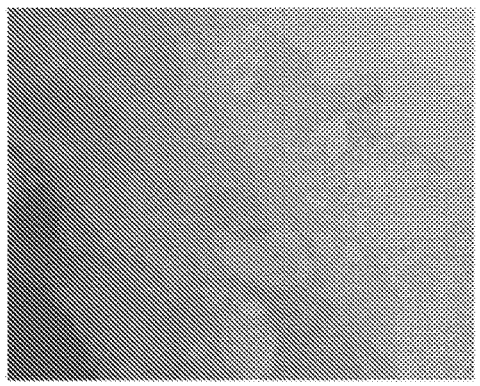
FIG. 3 illustrates the characterization of recovered material wherein a) shows a scanning electron microscope SEM image of recovered magnesium hydroxide $Mg(OH)_2$ from electrolysis of olivine digestion solution, b) shows thermo gravimetric analysis TGA of recovered magnesium hydroxide $Mg(OH)_2$ from olivine, and c) shows x-ray powder diffraction XRD of recovered magnesium hydroxide $Mg(OH)_2$ and of recovered silica (B: brucite, L: lizardite, F: forsterite)
Figure 3B:
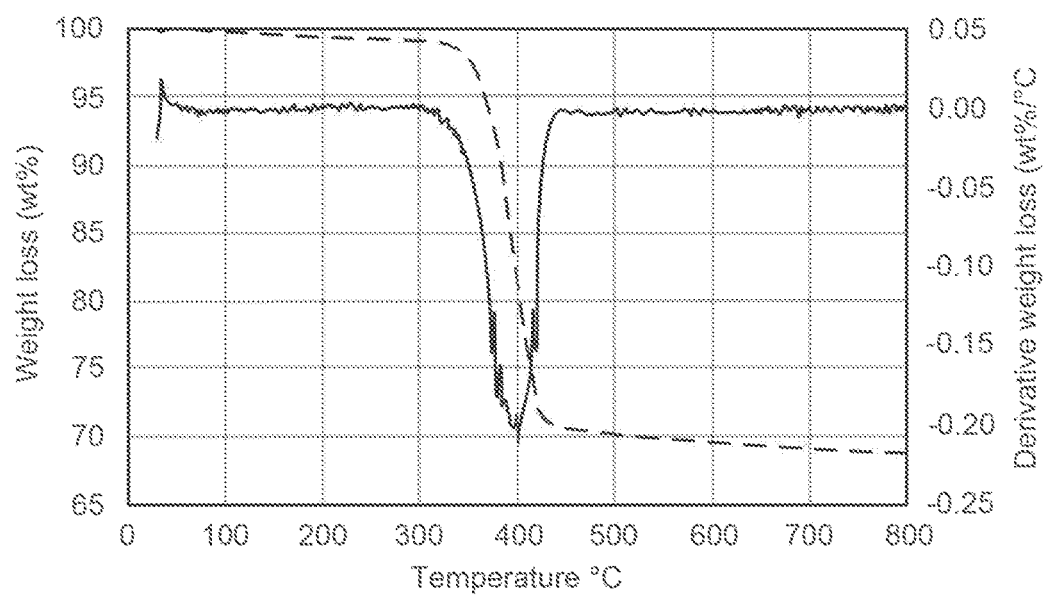
Figure 3C:
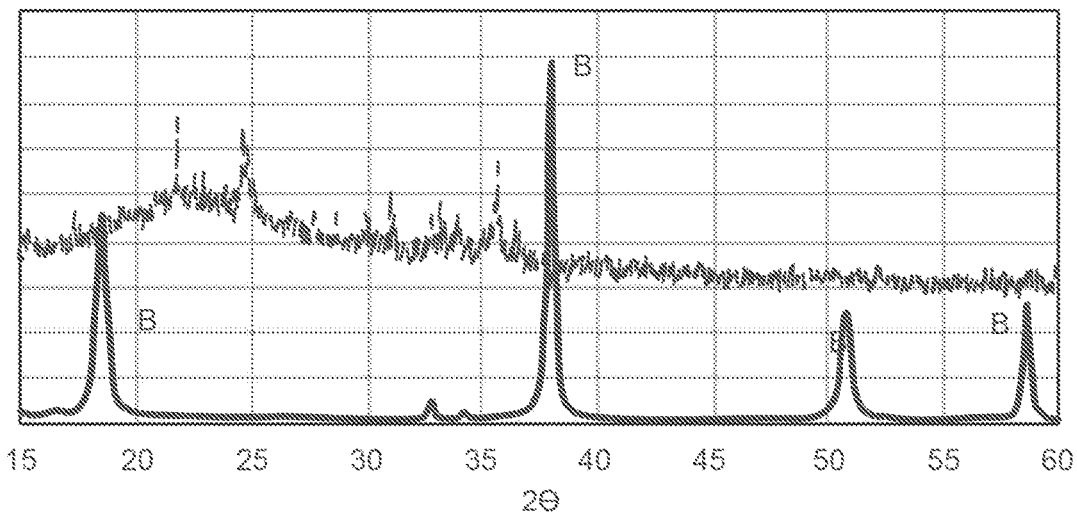

Commercial MgO (CM) and silica fume (SF) from Sibelco Australia and Sika New Zealand, respectively, were assessed and compared to the RS and RM described above. Chemical compositions of recovered and commercial MgO and SiO$_2$ are provided in Table 2. Loss on ignition (LOI) of recovered silica is high and can be explained by water loss in the polymerized silica. The recovered and commercial MgO both had similar MgO concentrations and include uncalcined brucite. Recovered silica, as shown in FIG. 3, was primarily amorphous silica with some minor amounts of unreactive olivine.

TABLE 2

Chemical composition of raw materials (%/100 g) (REF)

| % | CM | RM | SF | RS |
|---|---|---|---|---|
| $SiO_2$ | 2.11 | 0.19 | 94.85 | 63.18 |
| $Al_2O_3$ | 0.15 | 0.16 | 0.57 | 0.23 |
| $Fe_2O_3$ | 0.35 | 11.45 | 0.33 | 4.65 |
| CaO | 2.8 | 0.5 | 0.27 | 0.57 |
| MgO | 84.16 | 81.66 | 0.47 | 13.92 |
| $Na_2O$ | <0.01 | <0.01 | 0.33 | 0.03 |
| $K_2O$ | <0.01 | <0.01 | 0.76 | 0.06 |
| LOI | 10.66 | 5.63 | 1.94 | 16.37 |
| SSA ($m^2$/g) | 37 | 23 | 17 | 93 |

A $MgO-SiO_2$ binder was prepared by combining and mixing MgO and $SiO_2$ at 1:1 ratio by mass. Mix compositions between recovered and commercial products were investigated and are shown in Table 3. Paste samples with a water to binder (w/b) ratio of one were used; these mixes provided comparable workability and intrinsic hydration behaviours without the use of external agents like superplasticisers.

Paste samples (~20 g) were placed in an isothermal calorimeter at 20° C. (Calmetrix I-Cal Flex) and heat evolved related to hydration for a variety of mixes was measured. Remaining pastes were cured at 20° C. in PVC vials (Diameter 20 mm, Height 100 mm).

TABLE 3

Mix design proportion [ref]

| Notation | Commercial MgO | Silica Fume | Recovered MgO | Recovered Silica |
|---|---|---|---|---|
| CM-SF | 0.50 | 0.50 | — | — |
| RM-SF | — | 0.50 | 0.50 | — |
| CM-RS | 0.50 | — | — | 0.50 |
| RM-RS | — | — | 0.50 | 0.50 |

Paste samples, dried and ground, after 3, 7 and 28 days were assessed for hydration via XRD (Rigaku SmartLab Diffractometer), FTIR (Bruker Spectrometer Alpha II), scanning electron microscopy (SEM), electron microscopy (JEOL 6400 in secondary electron mode).

Compressive strengths for mortar samples were measured where a binder to sand ratio of 1:3 was used. Water to binder ratios with the addition of a superplasticizer addition was varied. Cube samples (50×50×50 mm) were cast and maintained at 20° C. and 60% relative humidity for 24 hours. Samples were stored at 20° C.

Results & Discussion

Heat Evolution

Figure 6:
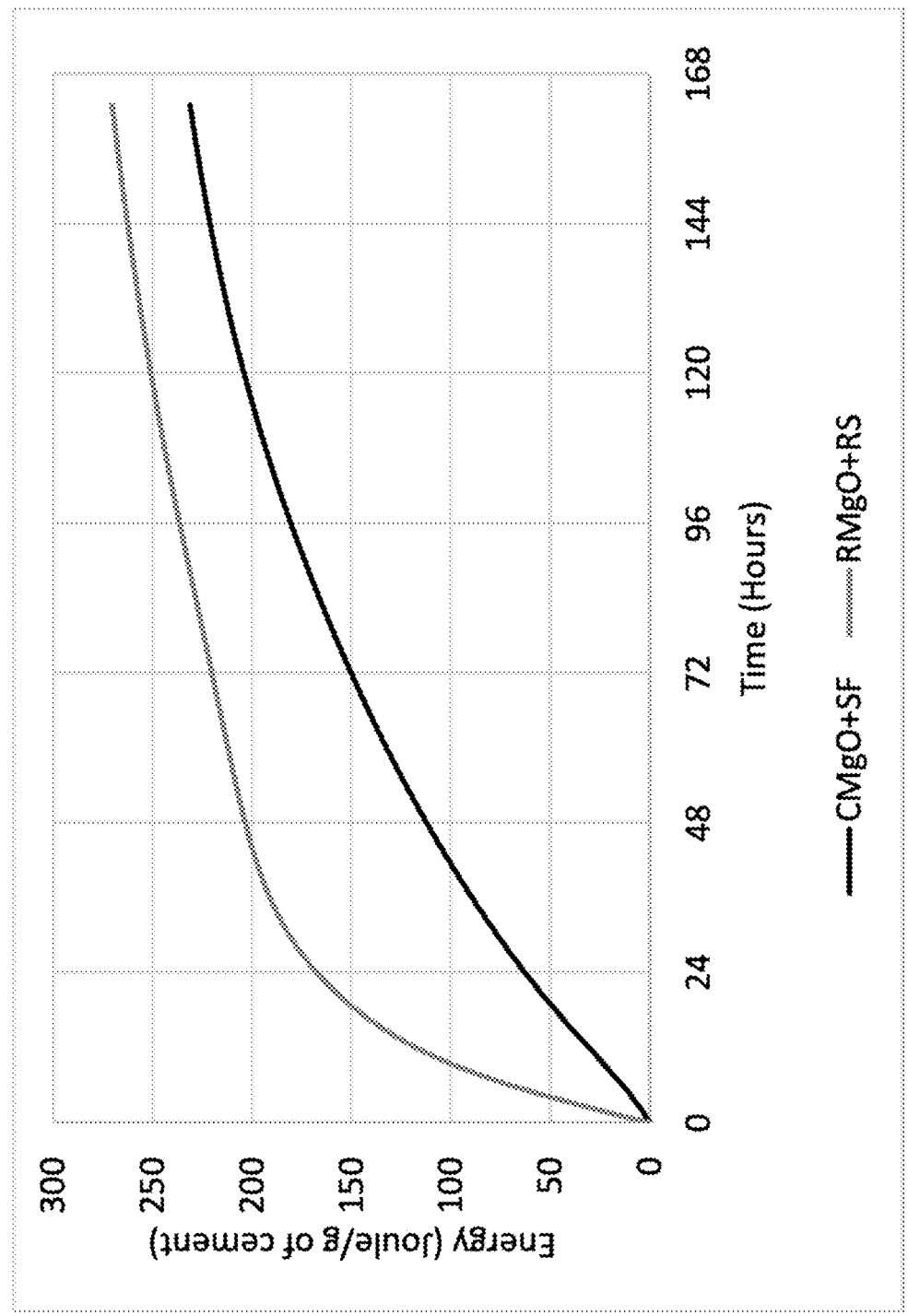
FIG. 6 shows cumulative heat measurements related to hydration reactions for the CMgO+SF and RMgO+RS over a period of 72 hours using isothermal calorimetry.

FIG. 6 shows cumulative heat measurements related to hydration reactions for the CMgO+SF and RMgO+RS over a period of 72 hours using isothermal calorimetry. Recovered MgO (RMgO)+recovered silica (RS) showed a faster and higher heat of hydration compared to Commercial MgO (CMgO)+silica fume (SF) mixes.

Hydration Products

Qualitative XRD Analysis

Figure 7:
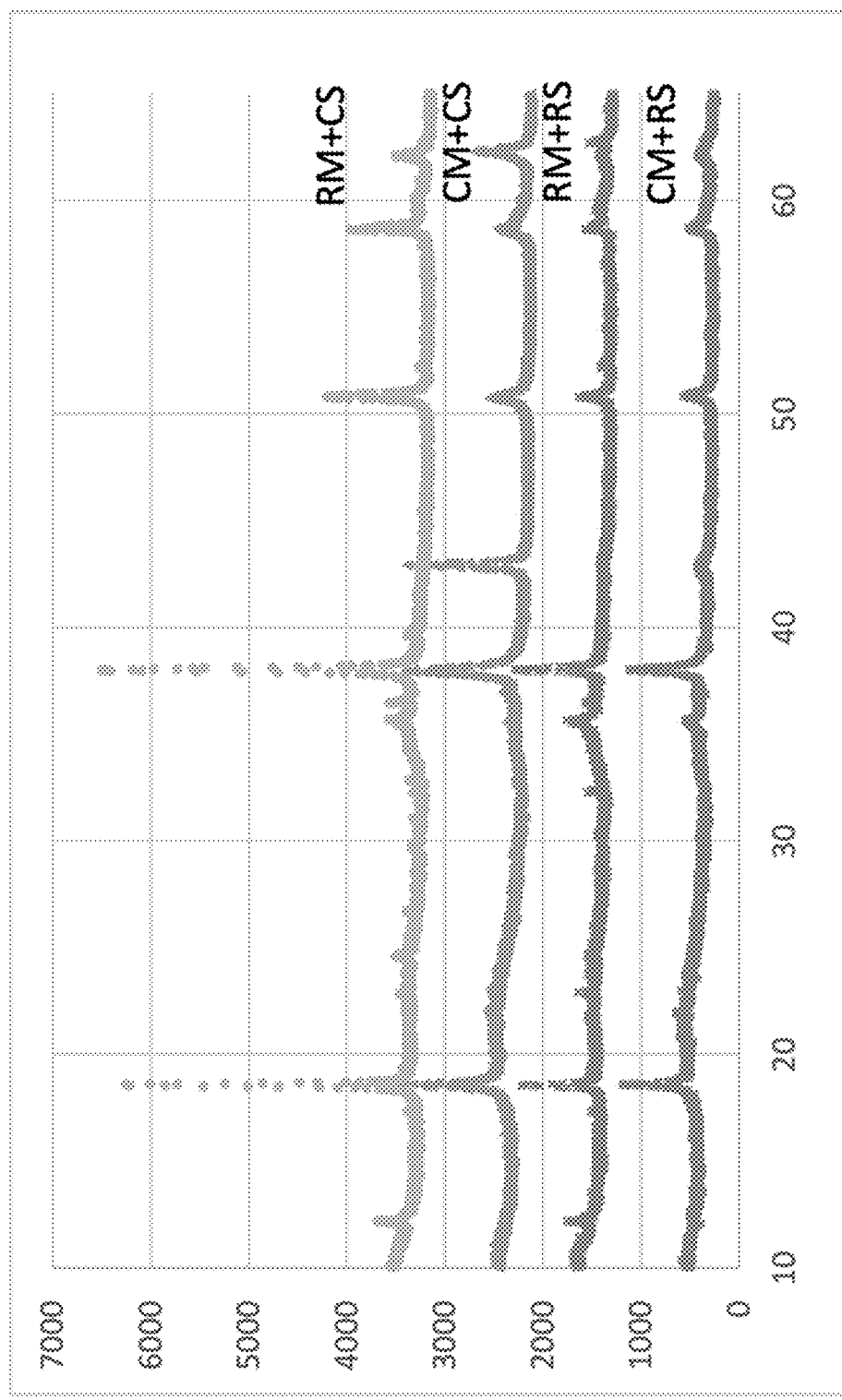
FIG. 7 shows XRD patterns hydrated samples (P: Periclase, B: Brucite, L: Lizardite, grey bands correspond to M—S—H).

XRD analyses of the hydrated samples is shown in FIG. 7. Peaks corresponding to brucite, related to MgO hydration, are present in all the mixes. Differences between the intensity of peaks in SF and RS mixes are present. The brucite peaks in RS mixes support a rapid reaction of RS with brucite to form M—S—H. Broad peaks representing amorphous M—S—H (shown as grey bands in FIG. 7) were present in the recovered silica mixes. Higher reactivity of RS is attributed to its high surface area. The CM-SF mix peaks that demonstrate unreacted MgO support an overall lower extent of hydration. For the CM-RS mix, brucite depletion by RS would require increased magnesium ions in pore solutions, which then furthers MgO consumption. This is supported by the absence of unreacted MgO in the CM-RS mix. XRD analyses suggest that the RM-SF mix provides faster dissolution of RM compared to CM. Additionally, the peak intensities of brucite compared to the prominent broad M—S—H peak in the RM-SF mix supports a faster brucite reaction with silica to form M—S—H. The analyses confirms that the materials recovered from olivine could be effectively used to produce $MgO-SiO_2$ binder.

Compressive Strength

Compressive strengths of mortar samples (3, 7 and 28 days) is shown in Table 4 and provides a comparison of the material characteristics. The compressive strength of the CM+RS mix at 3 days was ~60% higher compared to the CM+SF mix, despite a higher w/b ratio, possibly due to the rapid formation of M—S—H. This observation agrees with calorimetry results. Higher compressive strengths were observed after 7 days and the slower reacting SF continued to form M—S—H, thereby increasing its strength, after 28 days. The RM-RS mix had ~20% higher strength compared to CM-SF mix at 3 days despite a 50% higher w/b ratio. Strength development traits displayed by the RM-RS mixes supports that the $MgO-SiO_2$ binder using magnesium silicate minerals, such as olivine, is viable.

TABLE 4

Summary of compressive strength (MPa) of mixes

| | CM-SF (W/B: 0.50) | CM-RS (W/B: 0.58) | RM-RS (W/B: 0.75) |
|---|---|---|---|
| 3 Days | 13.7 | 21.9 | 16.5 |
| 7 Days | 30.1 | 31.4 | 21.6 |
| 28 Days | 49.1 | 36.0 | 22.0 |

Sustainability Assessment

Portland cement production is energy intensive and it requires that calcination of limestone which releases $CO_2$. The $MgO:SiO_2$ ratio of 1:1 used in this example, have shown effective binder systems can be produced with $MgO:SiO_2$ ratios from 0.4 to 0.6. The total energy is may be higher for the MgO-silica binder system sourced from Mg silicates, such as olivine, there is no chemical release of $CO_2$ from the raw materials during the manufacturing process, therefore, $CO_2$ generated from this process is dependent on the source of electricity.

Conclusions

This example demonstrates that $MgO-SiO_2$ binders can be produced from Mg silicates, such as olivine, and compares well with binders made from commercially available materials. Recovered MgO and $SiO_2$ were more reactive compared to commercial materials where the use of recovered silica enhanced the hydration rates. M—S—H formation during hydration was confirmed in binder produced using recovered materials. Compressive strengths for the CM-RS mix and CM-SF mix was comparable, where 28 day mortar strength of >20 MPa was determined for the RM-RS mix.

Example 3

The recovered and dried silica, as outlined in Example 2, was further tested to determine its potential use as partial replacement (SCM) for Portland cement. A binder was created using 30% recovered silica along with 70% Portland cement. The binder was mixed with sand at a ratio of 1:3 and a water/cement ratio of 0.5 to create a mortar cubes. The samples containing the recovered silica were found to have a 28 day compressive strength more than 10% greater than the control samples which were made using a 100% Portland cement binder. The results show that the recovered silica is capable of replacing at least 30% of the Portland cement while at the same time increasing the overall compressive strength.

Example 4

A solution of 1.5M magnesium sulphate was subject to electrolysis, whereby, after 2 hours magnesium hydroxide was recovered at the cathode (pH 10.1) and sulphuric acid was created at the anode (pH 1.56). These results show that the alternative magnesium salt of magnesium sulphate may be processed in a similar manner to other salts. The example also illustrates the way that magnesium hydroxide inherently increases solution pH.

Aspects of the magnesium silicate processing methods and uses of the processed magnesium silicate products have been described by way of example only and it should be appreciated that modifications and additions may be made thereto without departing from the scope of the claims herein.

What is claimed is:

1. A method of processing a magnesium silicate source by:
   selecting a magnesium silicate source selected from: olivine, serpentine, pyroxene, amphiboles, phyllosilicates, clays, or any combination thereof;
   subjecting the selected magnesium silicate source to water digestion at a temperature of less than 120° C. and wherein a ratio, by mass, of magnesium silicate source to water in the water digestion is 1 part magnesium silicate to 1 to 20 parts water to form a washed magnesium silicate;
   subjecting the washed magnesium silicate to acid digestion, to produce a digested solution, acid digestion comprising mixing the washed magnesium silicate at a temperature of less than 120° C. with acid sufficient to decrease a pH of the acid and the digested solution to −1-6 and, recovering evolved hydrogen gas during acid digestion; and
   completing a base wash by increasing the digested solution pH by addition of an alkali solution at a temperature of less than 120° C., to produce a magnesium salt solution consisting of magnesium chloride, magnesium sulphate, or both magnesium chloride and magnesium sulphate.

2. The method as claimed in claim 1 wherein evolved hydrogen gas is recovered during the water digestion.

3. The method as claimed in claim 1 wherein the acid used during acid digestion is hydrochloric acid or sulfuric acid.

4. The method as claimed in claim 1 wherein the base wash comprises two pH increasing steps including:
   a first increase in digested solution pH by at least 1 to 3 pH greater than the digested solution pH and removing precipitated silica from the magnesium salt solution; and
   a subsequent pH increase in digested solution pH to a pH of 6.0 or higher and removing precipitated iron oxide from the magnesium salt solution.

5. The method as claimed in claim 1 wherein the alkali solution is selected from the group consisting of: magnesium hydroxide, calcium hydroxide, potassium hydroxide, sodium hydroxide, and combinations thereof.

6. The method as claimed in claim 1 wherein the magnesium salt solution is subjected to electrolysis separation and magnesium hydroxide produced from the electrolysis is separated.

7. The method as claimed in claim 6 wherein the magnesium hydroxide produced from the electrolysis separation is recovered from an electrolysis cathode and wherein oxygen and chlorine produced form the electrolysis separation is recovered from an electrolysis anode.

8. The method as claimed in claim 6 wherein an additional step is completed after recovery of the magnesium hydroxide of:
   dehydrating the magnesium hydroxide to produce magnesium oxide (MgO).

9. The method as claimed in claim 6 wherein the method comprises an additional step of:
   reacting the magnesium hydroxide produced with carbon dioxide to form a magnesium carbonate containing compound.

10. The method as claimed in claim 1 wherein the magnesium salt solution is subjected to a further base wash by increasing the digested solution pH by addition of an alkali solution and subsequently, completing base separation and removal of magnesium hydroxide produced during the further base wash.

11. The method as claimed in claim 10 wherein an additional step is completed after recovery of the magnesium hydroxide of:
   dehydrating the magnesium hydroxide to produce magnesium oxide (MgO).

12. The method as claimed in claim 10 wherein the method comprises an additional step of:
   reacting the magnesium hydroxide produced with carbon dioxide to form a magnesium carbonate containing compound.

13. The method as claimed in claim 1 wherein acid digestion occurs at a temperature of approximately 60° C.

14. The method as claimed in claim 1 wherein sufficient acid is added during acid digestion to reduce the pH to 2-5.

15. A method of processing a magnesium silicate source by:
   selecting a magnesium silicate source selected from: olivine, serpentine, pyroxene, amphiboles, phyllosilicates, clays, or any combination thereof;
   subjecting the selected magnesium silicate source to water digestion wherein the magnesium silicate source is mixed with water to form a washed magnesium silicate;
   subjecting the washed magnesium silicate to acid digestion, to produce a digested solution, acid digestion comprising mixing the washed magnesium silicate at a temperature of 60° C. to 120° C. with acid sufficient to decrease a pH of the acid and the digested solution to −1-6 and, recovering evolved hydrogen gas during acid digestion;

completing a base wash by increasing the digested solution pH by addition of an alkali solution, to produce a magnesium salt solution consisting of magnesium chloride, magnesium sulphate, or both magnesium chloride and magnesium sulphate; and subjecting the magnesium salt solution to a further base wash by increasing the digested solution pH by addition of an alkali solution at a temperature of less than 120° C. and subsequently, completing base separation and removal of magnesium hydroxide produced during the further base wash.

16. The method as claimed in claim 15 wherein, once magnesium hydroxide is removed, a remaining solution is subjected to electrolysis to recover oxygen or chlorine at an anode and hydrogen at a cathode.

17. A method of processing a magnesium silicate source by:

selecting a magnesium silicate source selected from: olivine, serpentine, pyroxene, amphiboles, phyllosilicates, clays, or any combination thereof;

subjecting the selected magnesium silicate source to water digestion wherein the magnesium silicate source is mixed with water to form a washed magnesium silicate;

subjecting the washed magnesium silicate to acid digestion, to produce a digested solution, acid digestion comprising mixing the washed magnesium silicate with acid and, recovering evolved hydrogen gas during acid digestion;

completing a further water digestion step after the acid digestion, wherein the digested solution is mixed with water to form a washed digested solution; and completing a base wash by increasing a pH of the washed digested solution by addition of an alkali solution, to produce a magnesium salt solution consisting of magnesium chloride, magnesium sulphate, or both magnesium chloride and magnesium sulphate.

18. The method as claimed in claim 17 wherein the water digestion, the acid digestion, the further water digestion and the base wash all occur at a temperature of less than 120° C.

19. The method as claimed in claim 17 wherein the magnesium salt solution is subjected to electrolysis separation and magnesium hydroxide produced from the electrolysis is separated.

20. The method as claimed in claim 17 wherein the magnesium salt solution is subjected to a further base wash by increasing the digested solution pH by addition of an alkali solution and subsequently, completing base separation and removal of magnesium hydroxide produced during the further base wash.

* * * * *